Oct. 21, 1930.                A. MEISSNER                1,779,259
WAVE MEASUREMENT
Filed Nov. 20, 1926
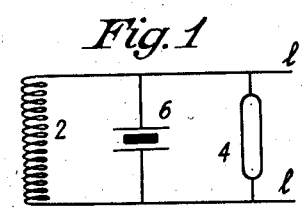
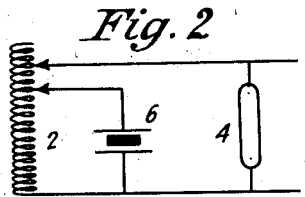
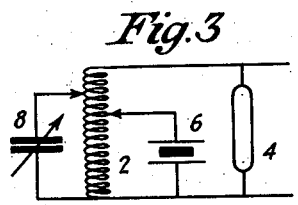
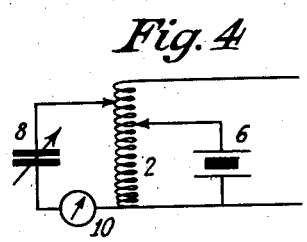
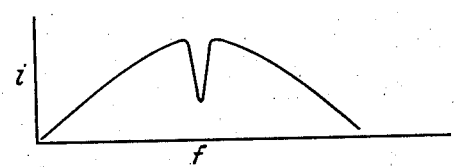
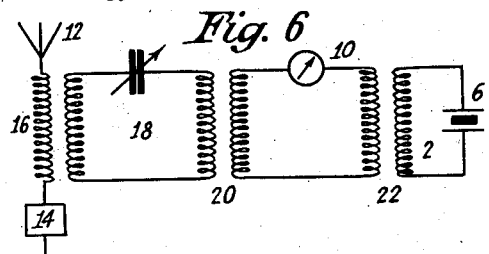
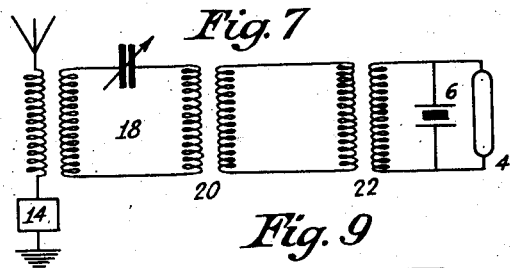
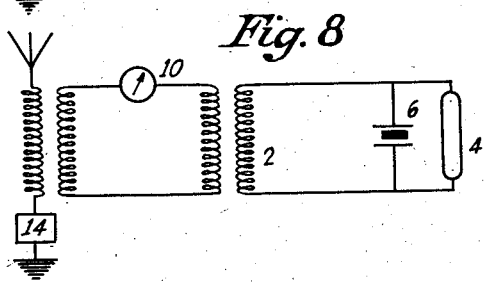
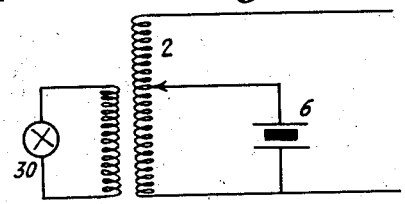
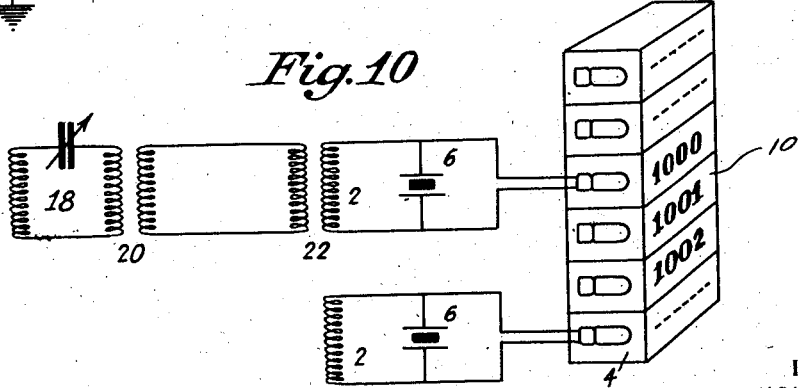
INVENTOR
ALEXANDER MEISSNER
BY
ATTORNEY Patented Oct. 21, 1930

1,779,259

UNITED STATES PATENT OFFICE

ALEXANDER MEISSNER, OF BERLIN, GERMANY, ASSIGNOR TO GESELLSCHAFT FUR DRAHTLOSE TELEGRAPHIE M. B. H., OF BERLIN, GERMANY, A CORPORATION OF GERMANY

WAVE MEASUREMENT

Application filed November 20, 1926, Serial No. 149,618, and in Germany December 9, 1925.

This invention relates to wave length or frequency measurement, and more particularly to a method and arrangement for this purpose utilizing crystals as the comparison standard.

The property of certain crystals whereby at a natural frequency the vibrations excited in the crystal itself produce luminous phenomena in the crystal is sometimes utilized. For this object the crystal has been placed in an evacuated vessel, the crystal flashing up at the instant where resonance exists between the vibrations of the crystal and the oscillations being impressed thereon. This arrangement involves the disadvantage that a separate vacuum vessel has to be provided. It has a further drawback in that to obtain exact wave calibration, or to alter the frequency the crystal must be removed from the evacuated vessel, which must each time be reexhausted until the crystal has been ground down to the desired correct dimensions.

An object of my invention is to eliminate these drawbacks. This I do by utilizing an entirely different effect, in that it is not the crystal itself which effects or produces the energy indication or luminous action, but rather that the crystal, by its energy consumption, influences the energy indication of some indicator, as for example, the luminous power of a light source, or the reading of a current indicator. The crystal and the indicator device in this arrangement are so coupled with an electrical system in which waves are set up by the main apparatus concerned that the indicator indicates energy upon both sides of the resonance position of the crystal, but indicates practically no energy in the resonance position itself. Hence, if a luminous source is employed as the indicator, the resonance or tuning position will manifest itself by an abrupt darkening and re-flashing of the light source. If an indicating instrument is used, the pointer will experience a dip. This determination of the resonance point is more convenient to the operator, and as a consequence, more accurate, than determinations made by the conventional method.

According to the present invention, the arrangement so far described may be improved further as to connections in this, that the coupling of the indicator and the crystal with the energy-absorbing system is effected in such a manner that the crystal no longer influences the energy-absorbing system, but only the indicator itself.

To locate the waves inside a certain range or band, it has previously been suggested to use a plurality of crystals ground so as to respond to waves differing but little from one another, and which upon the gradual adjustment and change of the wave of the electrical system to be observed and controlled, are caused to consecutively flash up on passing to said range.

Now, in accordance with the present invention the indications produced by several crystals are employed for the object of actuating a wave indicator device having a continuous wave scale. This may be accomplished, for instance, in a simple manner by that small glow-lamps are used as indicators, said glow-lamps being coordinated to respective crystals, and being so arranged in the rear of a frosted glass plate or pane upon which the wave-lengths are indicated that they are caused to illuminate the different sections of the scale. If, then, the entire wave band is passed through, that part of the scale will become darkened the corresponding crystal of which has been caused to respond in resonance.

Fig. 1 of the drawing is my circuit in simplest form and utilizing a luminous glow tube;

Fig. 2 is a modification;

Fig. 3 is a form using a resonant circuit, thereby making the indication more pronounced;

Fig. 4 shows how an indicator, for example an ammeter, may be used to secure the desired indication;

Fig. 5 is a curve showing the type of indication secured in the arrangement shown in Fig. 4;

Fig. 6 shows a modification designed to permit of the crystal affecting the indicator but not the original circuit;

Fig. 7 is a modification utilizing a glow tube;

Fig. 8 is a simplified form;

Fig. 9 is a modification wherein the indicator may be an incandescent lamp, as well as a glow tube; and Fig. 10 is an indicator having a continuous frequency scale.

The electric system upon which the source to be examined is inducing may consist of a simple coil, as in Figs. 1 and 2, or an oscillation circuit as in Fig. 3. Referring to Fig. 1, 2 is a coil across which a potential is applied from the source being examined. This may be done by coupling coil 2 to the source, or by connecting leads 1—1 to any suitable type of coupling with the source. The potential across the coil 2 is also across the helium tube glow discharge tube 4, and normally is sufficient to illuminate the lamp. When the frequency becomes that for which the crystal 6 is resonant, the latter causes such a consumption of energy that there is not sufficient energy for the luminescence of the tube, with the result that the tube goes out.

Of course, the arrangement must be so chosen that the circuit is not damped unduly by the crystal or the indicator, and so that the glow discharge tube luminesces in the wave range to be examined. These adjustments are facilitated by a modification, as in Fig. 2, where the potential across tube 4 and the damping effect of crystal 6 are adjustable, as shown.

In Fig. 3 a resonant circuit containing the inductance 2 and the capacitance 8, either of which may be varied to tune the circuit, forms part of the arrangement. The resonant circuit and the crystal are tuned to the desired wave.

Another practicable plan as shown in Fig. 4, is to use a current indicator instrument 10 in the tuned oscillation circuit, which, on passing through the resonance point, experiences a sudden marked drop of energy just at the instant where the crystal is in resonance. This effect is illustrated by the curve in Fig. 5, where the current indication is plotted as a function of applied frequency.

In Fig. 6 there is illustrated an embodiment having such couplings that the crystal influences the indicator, but not the main circuit. The circuit to be examined is exemplified by the antenna circuit 12, containing the transmitter 14, and coil 16. The circuit 18 is inductively coupled to the antenna coil 16. It may be coupled to any other oscillation system. With this energy absorbing system the indicator 10 is coupled inductively by means of the coil 20, while the crystal 6 is coupled with the indicator by means of coil 22. In this manner, as will be noted, the crystal is no longer able to influence the system 18 as regards its energy absorption. Indeed, its function is merely confined and limited to effecting alterations in the energy absorption of the indicator device.

Fig. 7 is a modification utilizing a glow discharge tube 4 instead of an instrument type of indicator.

Instead of the oscillation circuit 18, a simple coil may be utilized. In effect, the modification shown in Fig. 8 would result.

Another scheme would be to conveniently combine the two coils 20 and 22 of the indicator 10, in Fig. 6, in the system 18.

Instead of the helium glow-discharge lamp, also a simple incandescent lamp 30 of small size could be employed, which, as shown in Fig. 9, is coupled most conveniently inductively by means of a short-circuit turn by way of the tuned circuit. The use of an ordinary incandescent lamp offers this advantage compared with the glow-discharge tube, that lags caused in the latter by hysteretic actions are absent.

Fig. 10 shows an embodiment, by way of example, which utilizes a continuous frequency scale. 10 is a frosted glass pane upon which the different wave-lengths are engraved; and 4 stands for the glow-lamps which are disposed in compartments in the rear of said glass pane in such a manner that each lamp illuminates the section of appropriate wave-length. Each lamp is connected, for example, with a coil 2 which is subject to induction from the system whose wave is to be observed or controlled. Each one of these arrangements is combined with a respective crystal 6. When a certain crystal comes to be in resonance with the system to be observed, it absorbs energy from the lamp circuit, and the lamp darkens. In this manner, by the appearance of the dark line upon the scale engraved on the frosted glass pane, it is possible to read the wave-length. By using several crystals in conjunction with the reading device before described, the location of the wave-length can be substantially simplified.

In the claims which follow I shall by the term "wave measurement" mean wave length or frequency measurement, it being a simple matter to arrange for either or both.

I claim:

1. Arrangement for wave measurement by means of crystals comprising several crystals resonant at neighboring wave lengths, an indicator combined with each crystal, a reading device having a continuous engraved wave scale, said indicators being disposed in the rear of said reading device in such a manner that they are individually made to indicate the scale divisions upon said reading device.

2. A crystal operated wave measurement device comprising a frosted glass pane having a continuous wave scale, a plurality of light indicators mounted so as to illuminate said wave scale, a plurality of indicator circuits adapted normally to energize said indicators, and a plurality of crystals resonant to waves within said scale, each of said crystals being adapted upon resonance to deenergize an appropriate light indicator.

3. A wave meter comprising in combination, a first alternating current circuit containing a light indicator, a second alternating current circuit having connected therein a piezo-electric crystal of predetermined natural period, said second circuit being coupled to said first alternating current circuit, a transparent scale associated with said light indicator, whereby said scale is illuminated by said indicator, said piezo-electric device being adapted to react upon said light indicator when the natural period of said piezo-electric device is in resonance with the frequency of the alternating current to be tested, whereby to de-energize said light indicator and to produce a visual indication thereof upon said scale.

4. A wave meter comprising in combination, an alternating current circuit having a coupling coil for coupling said circuit to the source of alternating current to be tested, a glow-lamp connected in said circuit, a piezo-electric device coupled to said circuit, said glow-lamp being energized by energy transferred from said source to said circuit, said piezo-electric device reacting upon said circuit when the natural period thereof is in resonance with the frequency of energy transferred from said source to said circuit to de-energize said glow-lamp.

5. A wave meter comprising in combination, a plurality of alternating current circuits, a glow-lamp connected in each of said circuits, a coupling coil in each of said circuits, whereby said circuits may be coupled to an alternating current source to be tested and whereby energy is transferred from said source to said circuits to energize said glow-lamps, a piezo-electric device associated with each of said circuits, each of said devices having a predetermined natural period, said devices being reacted upon by the aforesaid alternating current transferred to said circuits, each of said piezo-electric devices reacting upon a given circuit when the current flowing therein is in resonance with the natural period of said crystal, whereby to de-energize the glow-lamp contained in that circuit.

6. A wave meter comprising in combination, a plurality of alternating current circuits, a glow-lamp connected in each of said circuits, a coupling coil in each of said circuits, whereby said circuits may be coupled to an alternating current source to be tested and whereby energy is transferred from said source to said circuits to energize said glow-lamps, a piezo-electric device associated with each of said circuits, each of said devices having a predetermined natural period, said devices being reacted upon by the aforesaid alternating current transferred to said circuits, each of said piezo-electric devices reacting upon a given circuit when the current flowing therein is in resonance with the natural period of said crystal, whereby to de-energize the glow-lamp contained in that circuit, and a transparent scale positioned in front of said glow-lamps whereby the said scale is illuminated and the difference in luminosity made apparent by the decrease in light on said scale.

7. A wave meter comprising in combination, a plurality of alternating current circuits, a coupling coil connected in each of said circuits, whereby electric energy may be transferred to said circuits from a source of alternating current whose frequency is to be tested, a separate piezo-electric device connected in each of said circuits, each of said devices having a different predetermined natural period, and a glow-lamp connected across each of said devices in each of said circuits, said glow-lamps being energized from energy transferred from said source to said circuits and de-energized when the natural period of the piezo-electric device which is associated with one of said lamps is in resonance with the frequency of the alternating current source.

8. A wave meter comprising in combination, a plurality of alternating current circuits, a coupling coil connected in each of said circuits whereby electric energy may be transferred to said circuits from a source of alternating current whose frequency is to be tested, a separate piezo-electric device connected in each of said circuits, each of said devices having a different predetermined natural period, a glow-lamp connected across each of said devices in each of said circuits, said glow-lamps being energized from energy transferred from said source to said circuits and de-energized when the natural period of the piezo-electric device which is associated with one of said lamps is in resonance with the frequency of the alternating current source, and a transparent scale mounted in front of said lamps, each of said lamps being adapted to light a predetermined portion of said scale, and said lighted portion being adapted to become less luminous when the lamp which illuminates it is de-energized by its associated piezo-electric device.

ALEXANDER MEISSNER.